United States Patent
Suzuki et al.

(10) Patent No.: US 6,770,352 B2
(45) Date of Patent: Aug. 3, 2004

(54) FILM PROVIDED WITH HARDCOAT AND PROCESS FOR PRODUCING THE SAME

(75) Inventors: Hiroko Suzuki, Tokyo-To (JP); Fumihiro Arakawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 52 days.

(21) Appl. No.: 09/988,404

(22) Filed: Nov. 19, 2001

(65) Prior Publication Data

US 2002/0110692 A1 Aug. 15, 2002

(30) Foreign Application Priority Data

Nov. 21, 2000 (JP) ........................................ 2000-354367

(51) Int. Cl.⁷ ............................. C08F 2/50; B32B 3/00; B32B 7/04
(52) U.S. Cl. ..................... 428/142; 428/141; 359/580; 359/581; 359/601; 359/582; 264/494; 264/495; 427/162; 427/164; 427/487; 427/489; 427/508; 427/515; 522/77; 522/148; 522/172
(58) Field of Search ................................ 428/141, 142; 264/494, 495; 359/580, 581, 601, 528; 427/162, 164, 167, 487, 489, 508, 515; 522/77, 148, 172

(56) References Cited

U.S. PATENT DOCUMENTS 5,773,126 A * 6/1998 Noritake et al. ............ 428/143
6,319,594 B1 * 11/2001 Suzuki et al. ............... 428/208

FOREIGN PATENT DOCUMENTS

JP 8174741 * 7/1996
JP 8188661 * 7/1996

* cited by examiner

*Primary Examiner*—James J. Seidleck
*Assistant Examiner*—Sanza L. McClendon
(74) *Attorney, Agent, or Firm*—Parkhurst & Wendel, L.L.P.

(57) ABSTRACT

Disclosed is a film provided with a hardcoat which has high surface hardness and improved apparent scratch resistance. This film provided with a hardcoat comprises: a transparent substrate film; and, stacked on the transparent substrate film in the following order, a hardcoat and a slip layer. The hardcoat is formed of a cured product of a material comprising an ultraviolet-curable resin and a photopolymerization initiator which initiates the photopolymerization of the ultraviolet-curable resin upon exposure to ultraviolet light in its wavelength region other than the wavelength region absorbable by the transparent substrate film. The slip layer contains a slip agent.

10 Claims, 1 Drawing Sheet

FILM PROVIDED WITH HARDCOAT AND PROCESS FOR PRODUCING THE SAME

BACKGROUND OF THE INVENTION

1. Field of the Invention

The present invention relates to a film provided with a hardcoat, which comprises a coating provided, for example, on the surface of various plastic films and has been improved in physical and chemical properties, for example, hardness, such as scratch resistance, and contamination resistance, and thus has high durability, and a process for producing the same.

2. Background Art

Films provided with a hardcoat, when used, are applied to various articles, and are colorless transparent or colored transparent as a whole so that the appearance of the articles can be seen or, when the films are applied, for example, to display equipment, the contents of display can be seen. These films have, on the surface thereof, a highly durable cured film which has been formed from a curable resin.

In the production of a film provided with a hardcoat, a heat-curable resin or an ultraviolet-curable resin is coated to form a coating which is then heated in the case of the former or is exposed to ultraviolet light in the case of the latter to cause crosslinking of the coating, thereby imparting necessary durability. In recent years, from the viewpoint of processing speed at the time of the production of the films, a method is in many cases adopted wherein an ultraviolet-curable resin is coated to form a coating which is then cured by ultraviolet irradiation.

The ultraviolet light is inferior to electron beams in the ability to pass through materials. Therefore, the interposition of an ultraviolet absorbing material lowers the ultraviolet irradiation efficiency and makes it impossible to satisfactorily cure the coating. This often results in the formation of a cured coating having somewhat lowered durability.

In this connection, the following fact should be noted. In the formation of a hardcoat, after the formation of an ultraviolet-curable coating on a transparent substrate film, ultraviolet light is applied to the coating to cure the coating. In this case, the application of the ultraviolet light through the transparent substrate film side is often inferior in irradiation efficiency to the application of the ultraviolet light from the coating side, because most of transparent substrate films contain an ultraviolet absorber for preventing a deterioration upon exposure to ultraviolet light.

For example, triacetylcellulose films, which are highly transparent to visible light and thus have been extensively used in optical applications, contain benzotriazole or other ultraviolet absorbers which absorb ultraviolet light with wavelengths around 340 to 350 nm.

The application of ultraviolet light from the ultraviolet-curable coating side can solve the problem of the absorption of ultraviolet light by the transparent substrate film. The application of ultraviolet light without covering the coating side, however, inhibits the polymerization of the coating due to the presence of oxygen in the air, and, thus, the degree of polymerization cannot be satisfactorily improved. For this reason, in some cases, the formed hardcoat does not have satisfactory durability. An attempt to cover the coating side, for example, with a transparent plastic film is likely to cause the coating to adhere to the transparent plastic film. Therefore, the transparent plastic film is not reusable and thus is wasteful.

In some cases, the film with a hardcoat is used in antireflection applications. In this case, a laminate of a plurality of layers, for example, metallic thin layers different from each other or one another in refractive index, are stacked on the hardcoat to form an antireflection film which, when used, is applied onto the surface of various displays.

In the case of this antireflection film for displays, the reflection of incident light from the front side can be prevented by the laminate of the plurality of metallic thin layers. On the other hand, regarding light from the backside, the incorporation of a light diffusing agent or the formation of fine concaves and convexes on the surface of the hardcoat is necessary from the viewpoint of preventing such an unfavorable phenomenon that the backside light derived from the display is seen in a highly bright state in specific sites.

In the former method, it is difficult, from the viewpoint of production control, to always incorporate the light diffusing agent in a given proportion.

On the other hand, in the latter method, concaves and convexes can be formed by putting a transparent concave/convex film on the ultraviolet-curable coating followed by the application of ultraviolet light through the concave/convex film. Also in this case, the coating material is likely to adhere to the concave/convex film, and, thus, the concave/convex film is not reusable and is wasteful.

When the coating is once cured followed by the formation of concaves and convexes using an emboss plate, the problem of the waste of the concave/convex film can be solved. In this case, however, since the coating is already in a cured state, the reproduction of concaves and convexes by embossing is unsatisfactory.

Further, although studies have been made on ultraviolet-curable resin compositions and curing methods for the formation of the hardcoat, a significant improvement could not have been achieved.

SUMMARY OF THE INVENTION

Accordingly, it is an object of the present invention to provide a film provided with a hardcoat which, at the time of the production of the film with a hardcoat, does not require the use of a transparent plastic film, which is likely to adhere to a coating, and has high durability, and to provide a film provided with a hardcoat which, despite the fact that the use of a transparent plastic film, which is likely to adhere to the coating, is not required at the time of the production of the film with a hardcoat, has a flat surface or has an embossed surface in which concaves and convexes of an embossing die have been faithfully reproduced.

It is another object of the present invention to improve the slipperiness of the film with a hardcoat without the use of any expensive material or without providing a complicate step and thus to improve apparent scratch resistance.

It is a further object of the present invention to provide a process for efficiently producing the above film provided with a hardcoat.

The object of the present invention could have been attained by incorporating, as a photopolymerization initiator, for example, a photopolymerization initiator, which is effective in the wavelength region of 350 to 450 nm, into an ultraviolet-curable layer stacked on a transparent substrate film in the production of a film provided with a hardcoat.

Further, the object of the present invention could have been attained by incorporating a slip agent into an ultraviolet-curable layer to be applied.

Furthermore, according to the present invention, the surface hardness of the hardcoat could have been further improved by adopting a method wherein, in curing the ultraviolet-curable layer, ultraviolet light is applied to the ultraviolet-curable layer from the transparent substrate film side followed by the application of ultraviolet light from the ultraviolet-curable layer side.

The ultraviolet irradiation in two stages in this way have permitted the slip agent to effectively bleed on the surface of the hardcoat, and the contemplated effect of the incorporation of the slip agent could have been satisfactorily attained.

According to a first aspect of the present invention, there is provided a film comprising: a transparent substrate film; and, stacked on the transparent substrate film in the following order, a hardcoat and a slip layer, said hardcoat being formed of a cured product of a material comprising an ultraviolet-curable resin and a photopolymerization initiator which initiates the photopolymerization of the ultraviolet-curable resin upon exposure to ultraviolet light in its wavelength region other than the wavelength region absorbable by the transparent substrate film, said slip layer containing a slip agent.

According to a second aspect of the present invention, there is provided a process for producing a film comprising a transparent substrate film and a hardcoat provided on the transparent substrate film, said process comprising the steps of:

forming, on the transparent substrate film, an ultraviolet-curable layer comprising an ultraviolet-curable resin and a photopolymerization initiator which initiates the photopolymerization of the ultraviolet-curable resin upon exposure to ultraviolet light in its wavelength region other than the wavelength region absorbable by the transparent substrate film;

covering the top surface of the ultraviolet-curable layer with an oxygen impermeable material; and applying ultraviolet light in its wavelength region, which permits the photopolymerization initiator to initiate the photopolymerization of the ultraviolet-curable layer, through the transparent substrate film to cure the ultraviolet-curable layer.

DETAILED DESCRIPTION OF THE INVENTION

The present invention will be described with reference to FIG. 1. A film 1 provided with a hardcoat according to the present invention basically comprises: a transparent substrate film 2; a hardcoat 4, formed of a cured product of an ultraviolet-curable resin composition, stacked on the transparent substrate film 2; and preferably a slip agent-containing slip layer 5 stacked on the hardcoat 4. In this specification, for example, in the stacked state, "upper" or "upper surface" and "lower" or "lower surface" correspond respectively to "upper" and "lower" in the drawing.

As shown in the drawing, a primer layer 3 may be interposed between the transparent substrate film 2 and the hardcoat 4 from the viewpoint of improving the adhesive strength between the transparent substrate film 2 and the hardcoat 4.

The surface of the hardcoat 4 may have concaves and convexes according to various purposes (or fine concaves and convexes) 6.

In the film 1 provided with a hardcoat according to the present invention, the transparent substrate film 2 may be either an ultraviolet absorbing transparent substrate film which contains an ultraviolet absorber from the viewpoint of preventing a deterioration in the substrate by ultraviolet light, or a transparent substrate film free from any ultraviolet absorber.

In the case of the transparent substrate film 2 containing an ultraviolet absorber, upon ultraviolet irradiation from the transparent substrate film 2 side (lower surface side in FIG. 1), ultraviolet light in a specific wavelength region is absorbed based on the properties of the incorporated ultraviolet absorber and, consequently, the transmission of ultraviolet light in the specific wavelength region is inhibited.

When the transparent substrate film 2 has been rendered ultraviolet light absorbable, preferably, the hardcoat 4 is formed using an ultraviolet-curable resin composition containing a photopolymerization initiator which can initiate the photopolymerization of the ultraviolet-curable resin upon exposure to ultraviolet light in its wavelength region other than the wavelength region absorbable by the transparent substrate film 2.

Preferably, the transparent substrate film 2 is visually transparent and smooth and, in addition, does not contain any foreign matter. Further, preferably, the transparent substrate film 2 is mechanically strong from the viewpoints of working and use applications. When the film provided with a hardcoat is applied, for example, to the front face of a display and is used in an environment wherein heat of the display is conveyed to the transparent substrate film 2, the transparent substrate film 2 is preferably heat resistant.

Generally preferred examples of the transparent substrate film 2 include films of thermoplastic resins, for example, cellulosic resins, such as cellulose diacetate, cellulose triacetate, or cellulose acetate butyrate, polyesters, such as polyethylene terephthalate (=PET), polyamide, polyimide, polyethersulfone, polysulfone, polypropylene, polymethylpentene, polyvinyl chloride, polyvinyl acetal, polyether ketone, polymethyl methacrylate, polycarbonate, and polyurethane.

In general, for example, polyester resin films commonly used as a substrate for photographic films and cellulose triacetate (=triacetylcellulose or TAC) films, which are also commonly used for photographic films by virtue of high transparency and the absence of optical anisotropy, are particularly preferred as the transparent substrate film 2.

The thickness of the transparent substrate film 2 is preferably about 8 to 1000 μm. When the substrate film 2 is in a plate form, however, the thickness may exceed the upper limit of the above thickness range.

These thermoplastic resin films are flexible and easy to handle. However, when there is no need to bend the substrate at the time of handling and the like and, rather, when a rigid, hard substrate is desired, a plate of the above resin, a glass plate or the like may be used.

The thermoplastic resin film for the transparent substrate film 2 sometimes contains an ultraviolet absorber from the viewpoint of improving the weathering resistance of the thermoplastic resin film per se. Benzotriazole ultraviolet absorbers, which are typical ultraviolet absorbers used for this purpose, absorb ultraviolet light with wavelengths of less than 340 nm, which overlap with an ultraviolet wavelength region effective in allowing conventional photopolymerization initiators to initiate the polymerization, and, thus, inhibit ultraviolet irradiation from the transparent substrate film side.

When the transparent substrate film 2 contains an ultraviolet absorber, the ultraviolet absorber preferably absorbs ultraviolet light with wavelengths of more than 340 nm.

In order to improve the adhesion of the transparent substrate film 2 to a layer formed thereon, for example, the transparent substrate film 2 may be subjected to various conventional treatments, that is, physical treatment, such as corona discharge treatment or oxidation treatment, or the above-described treatment wherein a coating composition called an anchor agent or a primer is previously coated to form a primer layer 3.

The hardcoat 4 is provided to improve the scratch resistance and thus to prevent the outermost surface of the film, provided with a hardcoat according to the present invention, from being scratched.

As described later, also when layers, which are mainly thin layers, are provided for various purposes on the hardcoat 4, the hardcoat 4 can improve the scratch resistance and thus can prevent the surface of these layers from being scratched.

The formation of a scratch is attributable to a difference in hardness between the layer and the counter material causative of scratching. In some cases, the hardcoat 4 may be formed of a composition comprising a thermoplastic resin as a resin component. In general, more preferably, the hardcoat 4 is formed of a cured product of a composition comprising a thermosetting resin as a resin component. For example, a composition comprising a polyurethane resin or the like, which is flexible, as a resin component is also used for constituting the hardcoat 4.

When a further improvement in scratch resistance is desired, the hardcoat 4 is preferably formed by applying ultraviolet light to an acrylate or other ultraviolet-curable resin composition to crosslink and cure the resin composition.

The hardcoat 4 preferably has a hardness of "H", or higher as measured by a pencil hardness test specified in JIS K 5400.

The ultraviolet-curable resin composition is preferably one prepared by properly mixing a prepolymer, an oligomer and/or a monomer having a polymerizable unsaturated bond or an epoxy group in the molecule thereof.

Examples of prepolymers and oligomers usable in the ultraviolet-curable resin composition include: unsaturated polyesters, such as condensates of unsaturated dicarboxylic acids with polyhydric alcohols; methacrylates, such as polyester methacrylate, polyether methacrylate, polyol methacrylate, and melamine methacrylate; acrylates, such as polyester acrylate, epoxy acrylate, urethane acrylate, polyether acrylate, polyol acrylate, and melamine acrylate; and cationically polymerizable epoxy compounds.

Examples of monomers usable in the ultraviolet-curable resin composition include: styrene monomers, such as styrene and α-methylstyrene; acrylic esters, such as methyl acrylate, 2-ethylhexyl acrylate, methoxyethyl acrylate, butoxyethyl acrylate, butyl acrylate, methoxybutyl acrylate, and phenyl acrylate; methacrylic esters, such as methyl methacrylate, ethyl methacrylate, propyl methacrylate, methoxyethyl methacrylate, ethoxymethyl methacrylate, phenyl methacrylate, and lauryl methacrylate; unsaturated substituted amino alcohol esters, such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate; unsaturated carboxylic acid amides, such as acrylamide and methacrylamide; compounds, such as ethylene glycol diacryalte, propylene glycol diacrylate, neopentyl glycol diacrylate, 1,6-hexanediol diacrylate, and triethylene glycol diacrylate; polyfunctional compounds, such as dipropylene glycol diacrylate, ethylene glycol diacrylate, propylene glycol dimethacrylate, and diethylene glycol dimethacrylate; and polythiol compounds having two or more thiol groups in the molecule thereof, for example, trimethyolpropane trithioglycolate, trimethyolpropane trithiopropylate, and pentaerythritol tetrathioglycolate.

In general, one or a mixture of two or more compounds described above is used as the monomer in the ultraviolet-curable resin composition. Preferably, however, in order to impart usual coatability to the ultraviolet-curable resin composition, the ultraviolet-curable resin composition comprises not less than 5% by weight of the prepolymer or the oligomer and not more than 95% by weight of the monomer and or the polythiol compound.

When flexibility is required of a cured product obtained by coating the ultraviolet-curable resin composition and curing the coating, the amount of the monomer may be reduced, or alternatively, an acrylate monomer having one or two functional groups may be used. When a cured product obtained by coating the ultraviolet-curable resin composition and curing the coating is required to have abrasion resistance, heat resistance, and solvent resistance, for example, an acrylate monomer having three or more functional groups may be used. Thus, the degree of freedom in the design of the ultraviolet-curable resin composition is high. Here acrylate monomers having one functional group include 2-hydroxy acrylate, 2-hexyl acrylate, and phenoxyethyl acrylate. Acrylate monomers having two functional groups include ethylene glycol diacrylate and 1,6-hexanediol diacrylate. Acrylate monomers having three or more functional groups include trimethyolpropane triacrylate, pentaerythritol triacrylate, dipentaerythritol tetraacryalte, and dipentaerythritol hexaacrylate.

A resin, which is uncurable by ultraviolet irradiation, may also be added to the ultraviolet-curable resin composition to regulate properties, such as flexibility or surface hardness, of a cured product obtained by coating the ultraviolet-curable resin composition and curing the coating. Specific examples of resins include thermoplastic resins, such as polyurethane resin, cellulose resin, polyvinylbutyral resin, polyester resin, acrylic resin, polyvinyl chloride resin, and polyvinyl acetate. Among others, the addition of polyurethane resin, cellulose resin, polyvinylbutyral resin or the like is preferred from the viewpoint of improving the flexibility.

Photopolymerization initiators or photopolymerization accelerators are added to conventional ultraviolet-curable resin compositions. Conventional photopolymerization initiators for a resin system having a radically polymerizable unsaturated group include acetophenones, benzophenones, thioxanthones, benzoins, and benzoin methyl ether. They may be used solely or as a mixture of two or more. In the case of a resin system having a cationically polymerizable functional group, for example, aromatic diazonium salts, aromatic sulfonium salts, aromatic idonium salts, metallocene compounds, and benzoinsulfonic esters may be used as the photopolymerization initiator either solely or as a mixture of two or more.

The amount of the photopolymerization initiator incorporated is 0.1 to 10 parts by mass based on 100 parts by mass of the ultraviolet-curable composition. When the amount of the photopolymerization initiator incorporated is excessive, the adhesion between the transparent substrate film 2 and the hardcoat 4 is often deteriorated, although this tendency depends upon the thickness of the hardcoat 4.

The incorporation of the photopolymerization initiator into the primer layer 3 can further improve the adhesion between the transparent substrate film 2 and the hardcoat 4.

When the transparent substrate film 2 absorbs ultraviolet light, the photopolymerization initiator can preferably react in the wavelength region of not less than 340 nm, more preferably 350 to 450 nm.

The lower limit has been determined by taking into consideration the absorption of light by an ultraviolet absorber which is frequently contained in the transparent substrate film 2. When a photopolymerization initiator, which can react in the wavelength region of less than 340 nm, is used, the reaction does not satisfactorily take place. When the photopolymerization initiator absorbs light with wavelengths above the upper limit, the absorption is visible to human's eyes. Therefore, there is a fear of the hardcoat 4 being seen in a colored state.

For example, 2,4,6-(trimethylbenzoyl)-diphenylphosphine oxide (available as Lucirin-TPO (tradename), manufactured by BASF) is particularly preferred as the photopolymerization initiator because this initiator, when incorporated in the above range, can initiate photopolymerization through the utilization of ultraviolet light with wavelengths around 375 nm (350 to 400 nm).

Bis(2,4,6-trimethylbenzoyl)-diphenylphosphine oxide (available as Irgacure 819 (tradename), manufactured by Ciba Specialty Chemicals, K.K.) also exhibits substantially the same properties as the above 2,4,6-(trimethylbenzoyl)-diphenylphosphine oxide. This initiator, however, is highly reactive in the wavelength region of 400 to 450 nm, and, when the amount of bis(2,4,6-trimethylbenzoyl)-diphenylphosphine oxide used is not reduced, the hardcoat 4 is seen in a colored state. For this reason, the amount of bis(2,4,6-trimethylbenzoyl)-diphenylphosphine oxide used is preferably 0.1 to 5 parts by mass based on 100 parts by mass of the ultraviolet-curable resin composition.

2-Methyl-1-[4-(methylthio)phenyl]-2-morpholinopropan-1-one (available as Irgacure 907 (tradename), manufactured by Ciba Specialty Chemicals, K.K.) is not very effective when the substrate is a TAC film. This initiator, however, is highly reactive over a wide wavelength region and thus is effective when the substrate is, for example, a PET film. Likewise, 2-benzyl-2-dimethylamino-1-(morpholinophenyl)-butanone-1 (available as Irgacure 369 (tradename), manufactured by Ciba Specialty Chemicals, K.K.) is highly reactive over a wider wavelength region and thus has better internal curability than 2-methyl-1-[4-(methylthio)phenyl]-2-morpholinopropan-1-one and can realize the formation of a good hardcoat even when the formation of a thick hardcoat is desired.

A photopolymerization initiator, which initiates photopolymerization in other wavelength region, may be used, in combination with the above-described particularly preferred photopolymerization initiator, in such an amount range that does not inhibit the function of initiating the photopolymerization. The combined use of these initiators can offer advantages including increased curing speed.

The following reactive organosilicon compound may be additionally used in the ultraviolet-curable composition. For example, the first reactive organosilicon compound usable herein is represented by formula $R_m Si(OR')_n$ wherein R and R' each independently represent an alkyl group having 1 to 10 carbon atoms. The subscript m of R and the subscript n of R' are each an integer which satisfies a requirement represented by m+n=4. The second reactive organosilicon compound usable herein is a silane coupling agent. The third reactive organosilicon compound usable herein is an ultraviolet-curable silicon compound. Further, other suitable reactive organosilicon compounds may also be used.

Specific examples of the first reactive organosilicon compound represented by formula $R_m Si(OR')_n$ include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylporpoxysilane, dimethylbutoxysilane, methyldimethoxysilane, methyldiethoxysilane, and hexyltrimethoxysilane.

Specific examples of the silane coupling agent as the second reactive organosilicon compound include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, and dimethyldichlorosilane.

Specific examples of ultraviolet-curable silicon compounds as the third organosilicon compound usable in combination with other components in the ultraviolet-curable composition include organosilicon compounds having a plurality of functional groups, which are reacted and crosslinked upon ultraviolet irradiation, for example, organosilicon compounds having a polymerizable double bond group with a molecular weight of not more than 5,000. More specific examples of the third organosilicon compound include functional polysilanes having vinyl at one terminal, functional polysilanes having vinyl at both terminals, functional polysiloxanes having vinyl at one terminal, functional polysiloxane having vinyl at both terminals, and polysilanes having vinyl as a functional group or polysiloxanes having vinyl as a functional group produced by reacting these compounds.

More specifically, the following compounds may be mentioned as the third organosilicon compound.

In formulae (a) to (e), $R^1$ and $R^2$ each independently represent an alkyl group having 1 to 4 carbon atoms, and a to d and n are values that bring the molecular weight of the compound to not more than 5,000.

Other organosilicon compounds additionally usable in the ultraviolet-curable composition include (meth)acryloxysilane compounds, such as 3-(meth)acryloxypropyltrimethoxysilane and 3-(meth)acryloxypropylmethyldimethoxysilane.

The hardcoat 4 is formed by coating the above composition by a conventional coating method on a transparent substrate film 2 and then applying selected ultraviolet light to the coating to crosslink and cure the coating.

If necessary, from the viewpoint of preventing a deterioration in the hardcoat 4 in a product form upon exposure to ultraviolet light, an ultraviolet absorber may be incorporated into the hardcoat in such an amount that does not inhibit the initiation of the photopolymerization.

Thickness of the hardcoat 4 is preferably 0.5 to 30 μm, more preferably 2 to 15 μm.

In the film 1 provided with a hardcoat, as well as in the antireflection film, when the thickness of the hardcoat 4 is too small, durability of the formed surface, such as hardness or contamination resistance, is unsatisfactory, while, when the thickness is too large, the flexibility of the whole product is lowered and, in addition, a lowering in production efficiency, such as the necessity of a lot of time for curing, occurs.

Figure 1:
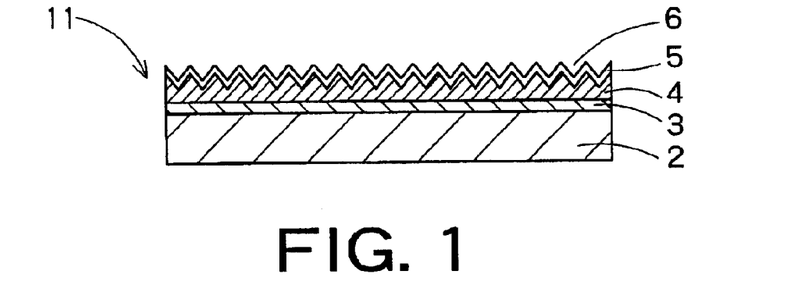
FIG. 1 is a cross-sectional view of a film provided with a hardcoat.

As shown in FIG. 1, the provision of concaves and convexes 6 on the upper surface of the hardcoat 4 can impart, for example, texture or antireflection properties, to the surface, or, in the case of the antireflection film, can scatter light incident upon a display from the transparent substrate film 2 side and thus can reduce such an unfavorable phenomenon that the brightness of the antireflection film in its specific portion is enhanced to cause unnatural "glare."

Figure 2:
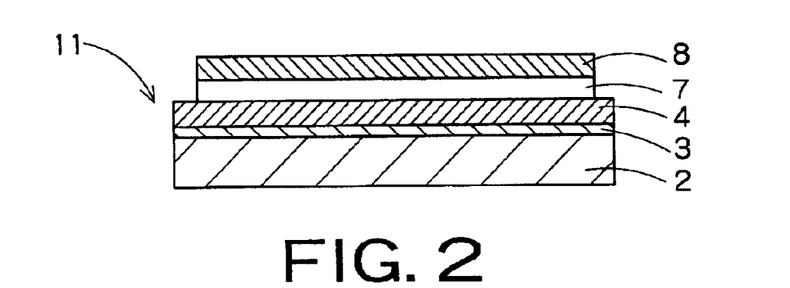
FIG. 2 is a cross-sectional view of an antirefleciton film having, stacked on its surface, a high-refractive layer and a low-refractive layer.
Figure 3:
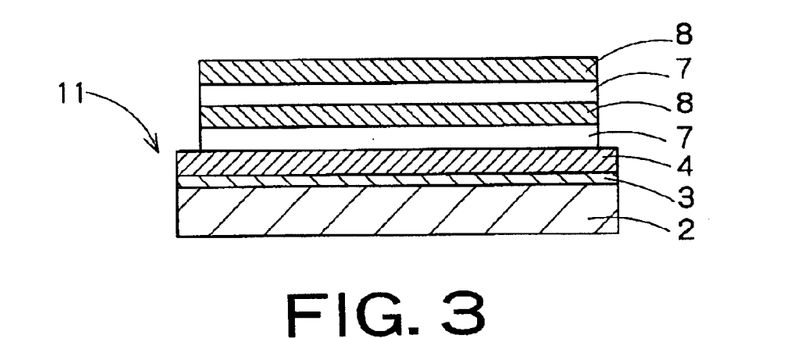
FIG. 3 is a cross-sectional view of an antireflection film having, stacked on its surface, two units of a combination of a high-refractive layer with a low-refractive layer.
Figure 4:
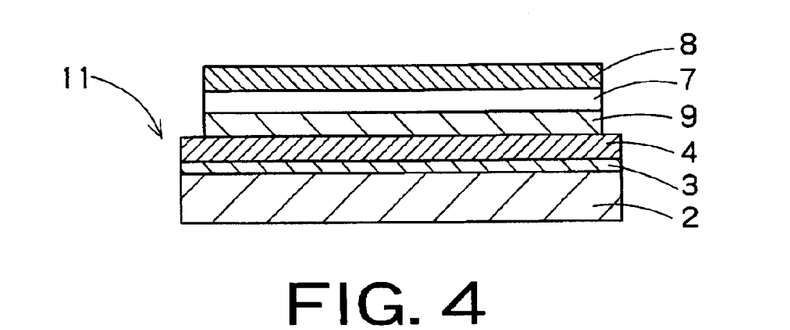
FIG. 4 is a cross-sectional view of an antireflection film having, stacked on its surface, a medium-refractive layer, a high-refractive layer, and a low-refractive layer.

In FIGS. 2 to 4, although concaves and convexes provided on the upper surface of the hardcoat 4 are not drawn for the convenience of the preparation of the drawings, concaves and convexes may be provided on the hardcoat 4. In this case, each layer overlying the hardcoat may have concaves and convexes conforming to the concaves and convexes of the underlying hardcoat 4.

Methods for forming concaves and convexes 6 usable herein include: one wherein, in the formation of a hardcoat 4 by coating onto a transparent substrate film 2, the coating is covered with an embossing film having concaves and convexes and, in this state, the coating is solidified; one wherein, in the formation of a hardcoat 4 by coating onto a transparent substrate film 2, an embossing means, such as an embossing roll, is pushed against the coating, if necessary, while heating the embossing means; and one wherein a hardcoat 4 is formed by coating on a releasable substrate having concaves and convexes on its releasable face to prepare a transfer sheet which is then used for the transfer of the hardcoat. Preferably, use may be made of an emboss plate or emboss roll which may be formed of an oxygen-impermeable metal or other material and, in the formation of the hardcoat 4, does not permit an ultraviolet-curable resin composition to deposit thereon.

In general applications, the provision of concaves and convexes on the surface of the hardcoat is not always necessary. The level of the concaves and convexes may also vary, and, when the formation of a surface having different gloss is desired, a flat surface, called flat emboss, is often formed. Therefore, in this specification, flat emboss is also embraced in the concaves and convexes, and concaves and convexes of the emboss plate and embossing using an emboss plate correspond to "concaves and convexes" in this broad sense.

In the present invention, in imparting concaves and convexes in a narrow sense, as well as in forming a flat surface and, in extreme cases, a mirror surface, preferably, ultraviolet light is applied from the transparent substrate film side in such a state that the coating has been covered with an emboss plate or emboss roll formed of an oxygen-impermeable material.

The oxygen-impermeable material may be in the form of a plate comprising, for example, a metal or a plastic, as a surface material, the surface material having been optionally backed, or alternatively in the form of a roll comprising, for example, a metal or a plastic, as a surface material, the inside of the surface material having been optionally reinforced. Preferably, materials other than thin plastic films are used.

The level of concaves and convexes in imparting concaves and convexes to the coating is such that the difference of elevation between concaves and convexes is preferably 0.2 to 10 μm, more preferably not more than 3 μm, the pitch is preferably about 20 to 200 μm, Ra is preferably 0.10 to 0.40 μm, Rz is preferably 1.10 to 6.00 μm, and Sm is preferably 10 to 70 μm, more preferably 20 to 50 μm.

All of these parameters are those associated with the surface roughness specified in JIS (Japanese Industrial Standards). Specifically, Ra represents the arithmetic average roughness, Rz the 10-point average roughness, and Sm the average spacing of profile irregularities (concaves and convexes).

As described above, in the present invention, even when the transparent substrate film contains an ultraviolet absorber, ultraviolet light can be applied from the transparent substrate film side. Therefore, ultraviolet light can be applied in such a state that the coating is brought into intimate contact with an oxygen-impermeable material, such as a metallic emboss plate or a metallic emboss roll, that is, in such a state that oxygen has been cut off, whereby the curing level of the coating can be highly increased. Further, when a metallic emboss plate or a metallic emboss roll is used, the deposit of the coating does not occur. This can advantageously overcome a problem, involved in the application of ultraviolet light through the plastic film covering the coating, that the plastic film is not reusable.

Even after the problem of the ultraviolet absorber contained in the transparent substrate film 2 has been overcome, curing of the hardcoat 4 by ultraviolet irradiation from the transparent substrate film 2 side has a problem that the intensity of the ultraviolet light introduced from the transparent substrate film 2 side, when passed through the transparent substrate film 2 and the coating of the ultraviolet-curable resin composition, gradually decreases according to the distance transmitted through the transparent substrate film 2 and the coating.

Therefore, as can be seen, for example, from FIG. 1, microscopic observation of the hardcoat 4 reveals that the curing level of the hardcoat 4 increases toward the lower side of the hardcoat 4, and the curing level of the upper side of the hardcoat 4 is lower than the curing level of the lower side of the hardcoat 4.

The difference of the curing level is also influenced by the amount of the photopolymerization initiator incorporated and the amount of the ultraviolet absorber added for increasing the photostability of the product.

Accordingly, as a general rule, ultraviolet light is applied from the transparent substrate film 2 side. After that, preferably, ultraviolet light is also applied from the hardcoat 4 side to enhance the curing level.

When the ultraviolet light is applied from the hardcoat 4 side, the hardcoat 4 has been preferably covered with an oxygen-impermeable material. Since, however, the coating is cured to a considerable level upon the application of ultraviolet light from the transparent substrate film 2 side, the omission of the covering with the oxygen-impermeable material does not practically cause any trouble.

When the purpose of applying ultraviolet light is only to enhance the curing level of the hardcoat 4 and, at the same time, when ultraviolet light can be applied from the hardcoat side, simultaneous application of ultraviolet light from both sides is possible.

In order to improve the scratch resistance of the hardcoat 4, apart from the improvement in curing level of the hardcoat, a slip agent-containing slip layer 5 is preferably stacked onto the hardcoat 4.

Stacking the slip layer 5 does not change the hardness of the hardcoat 4. Since, however, the frictional force between the hardcoat 4 and a material, which comes into contact with the hardcoat 4, is lowered, the scratch resistance is apparently improved.

Slip agents usable for constituting the slip layer 5 include silicones, for example, dimethylsilicone oil, methylhydrogenpolysiloxane, methylphenylsilicone oil, cyclic dimethylpolysiloxane, or other silicone oils.

Various modified silicone oils may also be used, and examples thereof include: reactive silicone oils, for example, amino-modified, epoxy-modified, carboxyl-modified, carbinol-modified, methacryl-modified, mercapto-modified, phenol-modified, and one-end reactive, and dissimilar functional group-modified silicone oils; and nonreactive silicone oils, such as polyether-modified, methylstyryl-modified, alkyl-modified, higher fatty acid ester-modified, hydrophilic group-modified, higher alkoxy-modified, higher fatty acid-modified, and fluorine-modified silicone oils.

All of these silicone oils, when incorporated into the slip layer, exhibit the contemplated effect. Among them, nonreactive silicone oils, when added to the slip layer, have better effect than reactive silicone oils, and, thus, the addition of nonreactive silicone oils is preferred. The reason for this is believed to reside in that reactive silicone oils are reacted with the ultraviolet-curable resin composition, and, consequently, the bleedout of the silicone oils is inhibited. Among the nonreactive silicone oils, those having a non-bulky organic group are preferred from the viewpoint of easiness in bleedout.

Other slip agents usable herein include fluororesins and waxes.

The slip agents, such as silicones, are incorporated in an amount of 0.01 to 10 parts, preferably 0.1 to 2 parts ("parts" being by mass), based on 100 parts of the ultraviolet-curable resin in the ultraviolet-curable resin composition for constituting the hardcoat.

When the amount of the slip agent incorporated is below the lower limit of the above defined range, the effect of improving the scratch resistance is unsatisfactory. On the other hand, when the amount of the slip agent incorporated is above the upper limit of the above defined range, curing at the time of the formation of the hardcoat 4 is unsatisfactory.

When the hardcoat 4 is formed from an ultraviolet-curable resin composition containing the above slip agent and, in this case, when ultraviolet light is first applied from the transparent substrate film 2 side to polymerize the ultraviolet-curable resin contained in the ultraviolet-curable resin composition, the silicone compound contained in the composition is gradually pushed out of the polymerized portion, and consequently is bled out onto the upper surface side of the hardcoat 4 (the surface of the hardcoat 4 remote from the transparent substrate film 2).

Silicones having affinity in the ultraviolet-curable resin composition are usually selected as this type of silicones (silicone compounds). Therefore, even when the bleedout has occurred, there is no possibility that the ultraviolet-curable resin or a cured product thereof is separated from the silicone compound with a clear boundary being formed therebetween. In fact, on the surface of the hardcoat 4 is formed a slip layer 5 wherein the silicone compound is contained in a cured product of the ultraviolet-curable resin and the content of the silicone compound increases toward the upper surface (surface remote from the transparent substrate film 2). That is, a slip layer 5 having a silicone compound content gradient is formed.

In the slip layer 5, the content of the ultraviolet-curable resin is lowered toward the upper surface of the slip layer 5. Therefore, when the ultraviolet light is applied from the transparent substrate film 2 side only, the slip layer 5 is less likely to be fully cured. To fully cure the slip layer 5 and, if necessary, the upper side of the hardcoat 4, the ultraviolet light is further applied from the upper surface side of the hardcoat 4.

In the film 1 provided with a hardcoat according to the present invention, since the cured product of the ultraviolet-curable resin is also present in a slight amount on and around the upper surface of the slip layer 5, the silicone compound is well held within the slip layer 5. As opposed to the case wherein the silicone compound is contained in the thermoplastic resin, this can reduce the loss of the silicone compound with the elapse of time.

When the second ultraviolet irradiation is carried out, the silicone compound is already present in a high concentration on the hardcoat 4 in its side to be exposed, that is, the upper surface side of the hardcoat 4. Therefore, curing upon ultraviolet irradiation proceeds from the inside of the hardcoat 4 where the amount of the ultraviolet-curable resin remaining uncured is larger. This further promotes the bleedout of the silicone compound onto the surface of the hardcoat 4. The second ultraviolet irradiation can further improve the slipperiness of the surface.

Therefore, whatever the purpose of the application of ultraviolet light is to bleed out the silicone compound and to cure the slip layer, the ultraviolet irradiation is carried out twice, that is, from the transparent substrate film 2 side and from above the hardcoat. As described above, the ultraviolet irradiation from the transparent substrate film 2 side and the ultraviolet irradiation from above the hardcoat may be simultaneously carried out. More preferably, however, the ultraviolet irradiation from the transparent substrate film 2 side and the ultraviolet irradiation from above the hardcoat are carried out in that order.

In the film 1 provided with the hardcoat 4 according to the present invention, a plurality of layers different from each other or one another in refractive index may be stacked on the hardcoat 4 to prepare an antireflection film which, when used, is suitably set on the viewer side of displays or the like.

FIGS. 2 to 4 are cross-sectional views showing representative examples of this type of antireflection film.

An antireflection film 11 shown in FIG. 2 comprises, from the lower side, a transparent substrate film 2, a primer layer 3, and a hardcoat 4 and, stacked on the hardcoat 4 in the following order, a high-refractive layer 7 and a low-refractive layer 8.

Materials and formation methods for the transparent substrate film 2, the primer layer 3, and the hardcoat 4 are the same as those described above in connection with the film 1 provided with a hardcoat shown in FIG. 1

An antifouling layer (not shown) may be stacked onto the outermost surface of the antireflection film. The antifouling layer may also be stacked on the outermost surface of antireflection films which will be described later in connection with FIGS. 3 and 4. The provision of the primer layer 3 may be omitted in films including antireflection films shown in FIGS. 3 and 4 which will be described later.

The antireflection film 11 shown in FIG. 3 is different from the antireflection film 11 shown in FIG. 2 in that two units of a combination of the high-refractive layer 7 with the low-refractive layer 8 are provided. Preferably, an antifouling layer is stacked on the outermost surface of the antireflection film shown in FIG. 3.

The antireflection film 11 shown in FIG. 4 comprises a laminate composed of a transparent substrate film 2, a primer layer 3, and a hardcoat 4 and, stacked on the hardcoat 4 in the following order, a medium-refractive layer 9, a high-refractive layer 7, and a low-refractive layer 8.

Materials and formation methods usable for the high-refractive layer 7 in the antireflection film 11 shown in FIG. 3 are the same as those in the antireflection film 11 shown in FIG. 2. Further, materials and formation methods usable for the low-refractive layer 8 in the antireflection film 11 shown in FIG. 3 are the same as those in the antireflection film 11 shown in FIG. 2. The antireflection films 11 shown in FIGS. 2 and 3 will be collectively described later.

The antireflection film 11 shown in FIG. 4 will be described separately from the antireflection films 11 shown in FIGS. 2 and 3.

The high-refractive layer 7 may be a layer comprising ultrafine particles, preferably having a refractive index of not less than 1.5, dispersed in a binder resin, or alternatively may be a thin film formed of the same materials as described above.

Materials for ultrafine particles having a refractive index of not less than 1.5 include, for example, oxides, such as ZnO (refractive index 1.90; the numerical value in parentheses hereinafter indicates the refractive index), $TiO_2$ (2.3 to 2.7), $CeO_2$ (1.95), $Sb_2O_5$ (1.71), $SnO_2$ (1.997), indium tin oxide frequently abbreviated to "ITO" (1.95), antimony-doped indium tin oxide, $In_2O_3$ (2.00), $Y_2O_3$ (1.87), $La_2O_3$ (1.95), $Al_2O_3$ (1.63), $HfO_2$ (2.00), and $ZrO_2$ (2.05).

The ultrafine particles formed of an oxide having a refractive index of not less than 1.5 preferably have an average particle diameter of 2 to 100 nm, more preferably 5 to 30 nm.

Among the above ultrafine particles, ultrafine particles of $TiO_2$ are advantageous in that the amount of ultrafine particles necessary for the control of the refractive index may be small. In addition, since the amount of the binder resin can be relatively increased, the ultrafine particles of $TiO_2$ are also advantageous from the viewpoints of the formation of a high-refractive layer and the hardness of the high-refractive layer. $ZrO_2$ is optically inert and is particularly preferred because the light resistance and the moist heat resistance of the high-refractive layer 7 are very good.

As described above, the high-refractive layer 7 may be a layer comprising the above ultrafine particles dispersed in the binder resin. Specifically, ultrafine particles, together with the binder resin, may be brought to a coating composition which is then coated onto the hardcoat 4. Alternatively, the coating composition may be coated onto a separate transfer sheet to form a transfer layer which is then transferred onto the hardcoat 4.

Binder resins usable herein include those described above as the resin constituting the resin component contained in the composition for the hardcoat 4, that is, thermoplastic resins, thermosetting resins, and ultraviolet-curable resins (including reactive organosilicon compounds).

Although thermoplastic resins are usable as the binder resin, the use of thermosetting resins is preferred. More preferably, a coating composition is prepared using an ultraviolet-curable composition containing an ultraviolet-curable resin.

The ultrafine particles and the binder resin, together with other additives, is kneaded optionally with a solvent and a diluent to prepare a coating composition which is then coated on a hardcoat 4 or a transfer sheet by any coating method to form a coating followed by curing by means of curing means according to the composition.

In preparing the coating composition, for example, a surfactant, a dispersible monomer, and a polymer may be added from the viewpoint of improving the dispersibility of the ultrafine particles.

Although the preferred thickness of the high-refractive layer 7 somewhat varies depending upon the type of the ultrafine particles contained in the high-refractive layer 7 and the type of a metal constituting the high-refractive layer 7 described later, a thickness of about 60 to 180 nm is suitable as a whole for the high-refractive layer 7.

When the thickness of the high-refractive layer 7 is excessively large or excessively small, disadvantageously, the contemplated antireflection properties cannot be obtained.

The mass ratio of the ultrafine particles to the binder resin in the high-refractive layer 7 is determined so as to realize a predetermined value as the refractive index of the high-refractive layer 7. For example, if assume that ultrafine particles of $ZrO_2$, which are preferred ultrafine particles, are used, since the refractive index of $ZrO_2$ is 2.05, when a binder resin having a refractive index of 1.52 is used, the ratio of the ultrafine particles to the binder resin may be brought to 1:1.2.

When the proportion of the ultrafine particles is much smaller than the above predetermined ratio, the contemplated refractive index cannot be realized and, thus, the antireflection properties cannot be exhibited. On the other hand, when the proportion of the ultrafine particles is much larger than the above predetermined ratio, the hardness of the coating as the high-refractive layer 7 is unsatisfactory. In particular, when the proportion of the ultrafine particles is excessively high, a significant trouble occurs. Therefore, when the contemplated refractive index value is large, the use of ultrafine particles having a higher refractive index rather than an increase in the proportion of the ultrafine particles is preferred.

The high-refractive layer 7 may also be formed by forming a thin film by a gaseous phase method, such as sputtering or vapor deposition, using, as a vaporization source, the same material as the ultrafine particles having a refractive index of not less than 1.5.

The low-refractive layer 8 is a thin film formed of $SiO_2$, and may be formed, for example, by vapor deposition, sputtering, or plasma CVD, or by forming an $SiO_2$ gel film from a sol liquid containing an $SiO_2$ sol.

Alternatively, the low-refractive layer 8 may be formed on the high-refractive layer 7 by coating an ultraviolet-curable resin composition containing fluorine or containing fluorine and silicon onto the high-refractive layer 7 to form a coating and applying ultraviolet light to the coating. Further, the low-refractive layer 8 may be formed by combining the above methods.

Materials other than $SiO_2$ usable for constituting the low-refractive layer 8 include a thin film of $MgF_2$ and other materials. However, the use of the thin film of $SiO_2$ is preferred from the viewpoint of high adhesion to the underlying layer.

Among the above methods, plasma CVD is preferably carried out using an organosiloxane as a starting gas under conditions such that other inorganic evaporation source is absent. Further, it is preferred to maintain the laminate film, in which layers up to the high-refractive layer 7 have been stacked, at the lowest possible temperature.

The thickness of the low-refractive layer 8 is preferably about 50 to 110 nm, more preferably 80 to 110 nm. When the thickness is smaller than and larger than the above defined range, the antireflection function is unsatisfactory. For this reason, the above defined range is preferred from the viewpoint of providing effective antireflection function.

When the low-refractive layer 8 formed of $SiO_2$ contains an undecomposed organosiloxane and, at the same time, the ratio of carbon to silicon in the low-refractive layer 8 is 0.1 to 0.2, the antireflection film has flexibility on a level which is suitable from the viewpoint of handling and, in addition, the low-refractive layer 8 has excellent adhesion to the underlying layer.

The above low-refractive layer 8 is formed of $SiO_2$ having a contact angle of 40 to 180 degrees in terms of contact angle of the surface with water and is also favorable from the viewpoint of preventing the deposition of dust, that is, antifouling effect.

In the antireflection film 11 shown in FIG. 4, three layers of a medium-refractive layer 9, a high-refractive layer 7, and a low-refractive layer 8 are stacked in that order from the lower side on the hardcoat 4 to more effectively impart antireflection properties.

Here the "medium-refractive," "high-refractive," and "low-refractive" refer to relative refractive indexes in comparison of the refractive index among three layers different from one another in refractive index when the three layers different from one another in refractive index are stacked as shown in FIG. 4. The "medium-refractive" in FIG. 4 corresponds to "high-refractive" in the antireflection film 11 described above in connection with FIGS. 2 and 3. Further, the "high-refractive" in FIG. 4 is higher refractive index than the "high-refractive" in the antireflection film 11 described above in connection with FIGS. 2 and 3, that is, is the so-called "higher-refractive."

Accordingly, the three layers of the medium-refractive layer 9, the high-refractive layer 7, and the low-refractive layer 8 may be used interchangeably with a high-refractive layer, a higher-refractive layer, and a low-refractive layer in that order.

The medium-refractive layer 9 described below in connection with FIG. 4 has the same construction as the high-refractive layer 7 in the antireflection film 11 described above in connection with FIGS. 2 and 3. Further, the low-refractive layer 8 described below in connection with FIG. 4 has the same construction as the low-refractive layer 8 in the antireflection film 11 described above in connection with FIGS. 2 and 3. Therefore, the explanation of all of these layers will be omitted.

The high-refractive layer 7, which is the so-called "higher-refractive layer," shown in FIG. 4 will be explained.

The high-refractive layer 7 in FIG. 4 is a thin alloy film or a layer comprising ultrafine particles of the alloy dispersed in a binder resin. In this case, iron, nickel, chromium, titanium, hafnium, zinc, zirconium, molybdenum, or tantalum may be used as the alloying metal.

Since the high-refractive layer 7 is formed of an alloy, the high-refractive layer 7 is electrically conductive and imparts antistatic properties to the antireflection film 11. Further, the thin film of the alloy absorbs visible light and, when the thickness thereof is excessively large, lowers the transmittance of light. For this reason, the thickness of the thin film of the alloy is preferably 1 nm to 10 nm.

The high-refractive layer 7 may be formed, for example, by vapor deposition, sputtering, or plasma CVD.

Methods for forming each of the high-refractive layer 7, the low-refractive layer 8, and the medium-refractive layer 9 are roughly classified into thin film formation in a gaseous phase, such as vapor deposition or sputtering, and other methods, particularly coating.

The individual layers may be formed respectively by different methods. For example, a method may be adopted wherein the high-refractive layer 7 is formed in a thin film form in a gaseous phase and the low-refractive layer 8 is formed by coating. However, the formation of all the layers in a thin film form in a gaseous phase can provide an antireflection film having good performance, and, when all the layers are formed by coating, these layers can be formed with higher efficiency using a more inexpensive apparatus as compared with the formation of the thin films in a gaseous phase.

Coating methods include a method wherein coating is directly made on an object and a method wherein a film, which has been separately once formed by coating on a temporary substrate, is stacked by transfer.

As described above, the film 1 provided with a hardcoat and the antireflection film 11 according to the present invention may have an antifouling layer as the uppermost layer.

The antifouling layer is formed so as to prevent the deposition of refuse or soil on the surface of the film 1 provided with a hardcoat or the surface of the antireflection film 11, or so that, even when refuse or soil has been deposited on the surface of the film 1 provided with a hardcoat or the antireflection film 11, the deposited refuse or soil can be easily removed.

Specifically, for example, a coating composition containing a surfactant, such as a fluorosurfactant, or a fluororesin, a release agent, such as a silicone oil, or a wax is very thinly coated at a coverage, which does not change the optical performance, that is, at a coverage which does not lower the transparency or antireflection function of the film 1 provided with a hardcoat or the antireflection film 11. The excess portion may be wiped off.

Thus, the antifouling layer may be formed by coating, for example, every time when the necessity of forming the antifouling layer arises. Alternatively, the antifouling layer may be formed as a permanent layer. The thickness of the antifouling layer is preferably about 1 to 20 nm.

When the film 1 provided with a hardcoat has the slip layer 5 as the outermost surface, the slip layer 5 can function also as an antifouling layer. Therefore, in this case, there is no need to separately provide the antifouling layer even when the purpose of forming the slip layer 5 is to improve the scratch resistance of the film 1 provided with a hardcoat.

EXAMPLES

Example 1

An 80 $\mu$m-thick triacetylcellulose film (hereinafter referred to as "TAC film") was provided as a transparent substrate. An acrylic resin primer was roll coated on the transparent substrate at a coverage of 0.5 g m$^2$, and the coating was dried at a temperature of 80° C for 30 sec to form a primer layer.

This TAC film contains a benzotriazole ultraviolet absorber incorporated therein and absorbs not less than 50% of light in its wavelength region of 390 nm to 380 nm and not less than 90% of light with wavelengths of less than 380 nm.

The primer layer contained 4 parts of 2,4,6-(trimethylbenzoyl)-diphenylphosphine oxide based on 100 parts of the resin component, and was free from any ultraviolet absorber.

4 parts of 2,4,6-(trimethylbenzoyl)-diphenylphosphine oxide (Lucirin-TPO (tradename), manufactured by BASF) as a photopolymerization initiator and 1.5 parts of a polyether-modified silicone (BYK 307 (stock number), manufactured by Bik-Chemie) were incorporated into 100 parts of a monomer mixture of DPHA (dipentaerythritol hexaacrylate)/DPPA (dipentaerythritol pentaacrylate)/TMPTA (trimethylolpropane triacrylate) =3/2/5 (mass ratio; this shall apply hereinafter unless otherwise specified) (the monomer mixture referred to hereinafter has this composition) to prepare a composition for a hardcoat. This composition for a hard coat was coated by reverse roll coating to a thickness of 10 $\mu$m on the primer layer.

After coating, an emboss plate having a chromium surface, which has fine concaves and convexes, was put on top of the coating so that the fine concaves and convexes were brought into contact with the surface of the coating. Ultraviolet light with wavelengths of more than 365 nm was applied at 500 mJ through the substrate side in the assembly to cure the coating. The emboss plate was then separated and removed, and ultraviolet light with wavelengths of more than 365 nm was then applied at 200 mJ from the coating side. Thus, a film was prepared which was provided with a hardcoat having reproduced fine concaves and convexes on its surface and possessing high scratch resistance.

The irradiation intensity of the ultraviolet light described in this specification is a value measured with an ultraviolet intensity meter (UV 300 H (stock number), manufactured by Toray Techno Co., Ltd.).

Example 2

The procedure of Example 1 was repeated, except that the amount of the photopolymerization initiator incorporated in the composition for a hardcoat was changed to 2 parts, based on 100 parts of the monomer mixture, of 2,4,6-(trimethylbenzoyl)-diphenylphosphine oxide (Lucirin-TPO (tradename), manufactured by BASF) and 3 parts, based on 100 parts of the monomer mixture, of 1-hydroxy-cyclohexyl-phenyl-ketone (Irgacure 184 (tradename), manufactured by Ciba Specialty Chemicals, K.K.), the silicone was changed to 0.3 part, based on 100 parts of the monomer mixture, of ethylene oxide propylene oxide-modified silicone (L 7001, manufactured by Nippon Unicar Co., Ltd.), and the emboss plate was changed to a flat plate. Thus, a film was prepared which comprised a TAC film as the substrate and was provided with a hardcoat having a clear surface and possessing high scratch resistance.

Example 3

An 80 $\mu$m-thick polyethylene terephthalate (hereinafter referred to as "PET") film was provided as a substrate. A primer layer was formed on the substrate in the same manner as in Example 1. This PET film was free from any ultraviolet absorber having substantial adverse effect on ultraviolet irradiation.

2 parts of 2-methyl-1-[4-(methylthio)phenyl]-2-morpholinopropan-1-one (Irgacure 907 (tradename), manufactured by Ciba Specialty Chemicals, K.K.) and 2 parts of 2-hydroxy-2-methyl-1-phenyl-propan-1-one (Darocur 1173 (tradename), manufactured by Ciba Specialty Chemicals, K.K.) as photopolymerization initiators and 1 part of a polyether-modified silicone oil (KF 618, manufactured by The Shin-Etsu Chemical Co., Ltd.) as a silicone compound were incorporated into 100 parts of the monomer mixture to prepare a composition for a hardcoat. The composition for a hardcoat was coated on the substrate in the same manner as in Example 1. The coating was then brought into contact with an emboss plate, followed by ultraviolet irradiation.

Ultraviolet light with wavelengths of more than 365 nm was applied at 60 mJ through the substrate side to cure the coating. The emboss plate was then separated and removed, and ultraviolet light with wavelengths of more than 365 nm was then applied at 300 mJ from the coating side. Thus, a film was prepared which was provided with a hardcoat having reproduced fine concaves and convexes on its surface and possessing high scratch resistance.

Comparative Example 1

In the same manner as in Example 2, a primer layer was formed on the TAC film as the substrate. A composition for a hardcoat was prepared in the same manner as in Example 2, except that only the silicone compound was changed.

Regarding the silicone compound, 1 part of a polyether-modified silicone oil (KF 618, manufactured by The Shin-Etsu Chemical Co., Ltd.) was incorporated instead of 0.3 part of the ethylene oxide propylene oxide-modified silicone (L 7001, manufactured by Nippon Unicar Co., Ltd.) used in Example 2.

The composition for a hardcoat was coated in the same manner as in Example 2. A flat plate was provided instead of the emboss plate, and the coating was brought into contact with the flat plate, followed by ultraviolet irradiation.

Ultraviolet light with wavelengths of less than 365 nm was applied at 1800 mJ through the substrate side to cure the coating. The flat plate was then separated and removed, and ultraviolet light with wavelengths of less than 365 nm was then applied at 300 mJ from the coating side. Thus, a film was prepared which was provided with a hardcoat having a clear surface.

The film provided with a hardcoat prepared in Comparative Example 1 had the same level of scratch resistance. Since, however, the exposure dose of ultraviolet light was excessively high, the exposure dose necessary for curing was large. This resulted in deteriorated stability levels in terms of heat resistance, moist heat resistance, light resistance and other properties. These lowered level of stability is considered attributable to the use of ultraviolet light with short wavelengths.

Comparative Example 2

A primer layer was formed on a TAC film as a substrate. 6 parts of 1-hydroxy-cyclohexyl-phenyl-ketone (Irgacure 184 (tradename), manufactured by Ciba Specialty Chemicals, K.K.) and 1.5 parts of polyether-modified silicone (BYK 307, manufactured by Bik-Chemie) as a silicone were incorporated into 100 parts of the monomer mixture to prepare a composition for a hardcoat. The composition for a hardcoat was coated on the substrate, and an emboss plate was brought into contact with the coating, followed by ultraviolet irradiation.

Ultraviolet light with wavelengths of more than 365 nm was applied at 500 mJ through the substrate side to cure the coating. The emboss plate was then separated and removed. Thus, a film was prepared which was provided with a hardcoat having reproduced fine concaves and convexes on its surface.

In this comparative example, ultraviolet irradiation from the coating side after the removal of the emboss plate was not carried out.

In this comparative example, since the ultraviolet irradiation from the coating side after the removal of the emboss plate was not carried out, the surface of the film provided with a hardcoat had unsatisfactory slipperiness and, in addition, unsatisfactory scratch resistance.

Comparative Example 3

A primer layer was formed on a TAC film as a substrate. 5 parts of 1-hydroxy-cyclohexyl-phenyl-ketone (Irgacure 184 (tradename), manufactured by Ciba Specialty Chemicals, K.K.) and 0.3 part of ethylene oxide propylene oxide-modified silicone (L 7001, manufactured by Nippon Unicar Co., Ltd.) as a silicone were incorporated into 100 parts of the monomer mixture to prepare a composition for a hardcoat. The composition for a hardcoat was coated on the substrate, and a flat plate was brought into contact with the coating, followed by ultraviolet irradiation.

Ultraviolet light with wavelengths of more than 365 nm was applied at 1800 mJ through the substrate side to cure the coating. The flat plate was then separated and removed, and ultraviolet light with wavelengths of more than 365 nm was then applied at 300 mJ from the coating side. Thus, a film was prepared which was provided with a hardcoat having reproduced fine concaves and convexes on its surface.

For the film thus obtained, due to the fact that the photopolymerization initiator, which can effectively initiate photopolymerization at wavelengths not absorbed by an ultraviolet absorber contained in the TAC film, was not incorporated into the composition for a hardcoat, the scratch resistance was low although the level of curing was seemed to be satisfactory at a glance.

Comparative Example 4

A primer layer was formed on a PET film as a substrate. 2 parts of 2-hydroxy-2-methyl-1-phenyl-propan-1-one (Darocur 1173 (tradename), manufactured by Ciba Specialty Chemicals, K.K.) and 1 part of a polyether-modified silicone oil (KF 618, manufactured by The Shin-Etsu Chemical Co., Ltd.) as a silicone were incorporated into 100 parts of the monomer mixture to prepare a composition for a hardcoat. The composition for a hardcoat was coated on the substrate, and an emboss plate was brought into contact with the coating, followed by ultraviolet irradiation.

Ultraviolet light with wavelengths of more than 365 nm was applied at 500 mJ through the substrate side to cure the coating. The emboss plate was then separated and removed, and ultraviolet light with wavelengths of more than 365 nm was then applied at 300 mJ from the coating side. Thus, a film was prepared which was provided with a hardcoat having reproduced fine concaves and convexes on its surface.

The composition for a hardcoat in this comparative example was the same as the composition for a hardcoat in Example 3, except that 2-methyl-1-[4-(methylthio)phenyl]-2-morpholinopropan-1-one (Irgacure 907 (tradename), manufactured by Ciba Specialty Chemicals, K.K.) was omitted from the composition for a hard coat in Example 3. Due to the absence of Irgacure 907, the wavelength region for polymerization initiation of the photopolymerization initiator contained in the composition was not in agreement with the ultraviolet wavelength region used in the exposure, and, in addition, the ultraviolet light in its wavelength region best suited for photopolymerization initiation was absorbed by the PET film. For this reason, the exposure dose of ultraviolet light from the substrate side was significantly increased as compared with the exposure dose adopted in Example 3. As a result, the obtained film had low scratch resistance although the coating was seemed to have been cured at a glance.

The films provided with a hardcoat prepared in Examples 1 to 3 and Comparative Examples 1 to 4 were evaluated for scratch resistance and, in addition, heat resistance, moist heat resistance, and light resistance. The results are shown in "Table 1."

The scratch resistance was evaluated based on the number of times of reciprocation in the reciprocation of steel wool of #0000 under a load of 2 kg/cm$^2$ and the appearance after the indicated number of times of reciprocation. In Table 1 in its column of the scratch resistance, ⊚ indicates that no scratch was observed by visual inspection after the indicated number of times of reciprocation; ○ indicates that several scratches were observed after the indicated number of times of reciprocation; and x indicates that a significant level of scratch was observed after the indicated number of times of reciprocation.

The heat resistance was evaluated in terms of adhesion of coating after a test at a temperature of 80° C. for 500 hr, the moist heat resistance was evaluated in terms of adhesion of coating after a test at a temperature of 60° C. and a relative humidity of 95% for 500 hr. Regarding the light resistance, the sample was exposed to ultraviolet light by means of Fade-O-Meter at a black panel temperature of 63° C., and the adhesion of coating was then evaluated in the same manner as described above in connection with the initial adhesion, and the light resistance test time (hr), together with the adhesion of coating after the elapse of this time, is shown in the table.

The adhesion of coating in the evaluation of heat resistance, moist heat resistance, and light resistance was evaluated as follows. Cuts were provided at intervals of 1 mm on the surface of the sample in both lengthwise and breadthwise directions to form 100 squares in total. A cellophane pressure-sensitive adhesive tape was applied onto the squares and was then separated, and this procedure was repeated five times without interruption. The sample was then inspected. The results are shown in Table 1. In table 1 in its columns of heat resistance, moist heat resistance, and light resistance, ⊚ indicates that the coating was not separated in both portions along the cuts provided with the cutter and cross-cut portions, that is, had good adhesion; ○ indicates that the coating was separated in portions along cuts provided with the cutter while the coating was not separated and had good adhesion in the cross-cut portions; and × indicates that the coating was separated in both portions along the cuts provided with the cutter and cross-cut portions.

TABLE 1

|  | Scratch resistance (number of times of reciprocation) | Heat resistance | Moist heat resistance | Light resistance, hr |  |
|---|---|---|---|---|---|
| Ex. 1 | 120 | ⊚ | ⊚ | ⊚ | 100 ⊚ |
| Ex. 2 | 120 | ⊚ | ⊚ | ⊚ | 100 ⊚ |
| Ex. 3 | 120 | ⊚ | ⊚ | ⊚ | 50 ⊚ |
| Comp. Ex. 1 | 120 | ○ | × | ⊚ | 25 × |
| Comp. Ex. 2 | 30 | ⊚ | ⊚ | ⊚ | 50 ⊚ |
| Comp. Ex. 3 | 1 | × | × | × | 25 × |
| Comp. Ex. 4 | 20 | ○ | ⊚ | ⊚ | 25 ⊚ |

What is claimed is:

1. A film comprising: a transparent substrate film; and, stacked on the transparent substrate film in the following order, a hardcoat and a slip layer,
   said hardcoat being formed of a cured product of a material comprising an ultraviolet-curable resin and a photopolymerization initiator that initiates the photopolymerization of the ultraviolet-curable resin upon exposure to ultraviolet light in its wavelength region other than the wavelength region absorbable by the transparent substrate film,
   said slip layer containing a slip agent, the slip layer being constructed so that the content of the slip agent in the slip layer increases from the top surface of the slip layer toward the top surface of the hardcoat.

2. The film according to claim 1, wherein the slip agent is silicone.

3. The film according to claim 1, wherein the ultraviolet wavelength region, which is absorbed by the transparent substrate film, is less than 350 nm, and the ultraviolet wavelength region, which is absorbed by the photopolymerization initiator, is 350 to 450 nm.

4. The film according to claim 1, wherein the surface of the hardcoat has fine concaves and convexes.

5. A process for producing a film comprising a transparent substrate film and a hardcoat provided on the transparent substrate film, said process comprising the steps of:
   forming, on the transparent substrate film, an ultraviolet-curable layer comprising an ultraviolet-curable resin and a photopolymerization initiator that initiates the photopolymerization of the ultraviolet-curable resin upon exposure to ultraviolet light in its wavelength region other than the wavelength region absorbable by the transparent substrate film;
   covering the top surface of the ultraviolet-curable layer with an oxygen impermeable material;
   applying ultraviolet light in its wavelength region, which permits the photopolymerization initiator to initiate the photopolymerization of the ultraviolet light-curable layer, through the transparent substrate film to cure the ultraviolet-curable layer;
   applying ultraviolet light in its wavelength region, which permits the photopolymerization initiator to initiate the photopolymerization of the ultraviolet light-curable layer, through the ultraviolet-cured layer to further cure the ultraviolet-cured layer.

6. The method according to claim 5, wherein the ultraviolet wavelength region, which is absorbed by the transparent substrate film, is less than 350 nm, and the ultraviolet wavelength region, which is absorbed by the photopolymerization initiator, is 350 to 450 nm.

7. The method according to claim 5, wherein a slip layer containing a slip agent is further formed on the ultraviolet-cured layer.

8. The method according to claim 7, wherein the slip layer is formed so that the content of the slip agent in the slip layer increases from the top surface of the slip layer toward the top surface of the ultraviolet-cured layer.

9. The method according to claim 5, which further comprises forming fine concaves and convexes on the surface of the ultraviolet-cured layer.

10. A film produced by the process according to claim 5.

* * * * *